(12) United States Patent
Kompella

(10) Patent No.: US 9,787,583 B2
(45) Date of Patent: *Oct. 10, 2017

(54) METHODS AND APPARATUS FOR IMPLEMENTING CONNECTIVITY BETWEEN EDGE DEVICES VIA A SWITCH FABRIC

(71) Applicant: Juniper Networks, Inc., Sunnyvale, CA (US)

(72) Inventor: Kireeti Kompella, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/237,411

(22) Filed: Aug. 15, 2016

(65) Prior Publication Data

US 2016/0373347 A1 Dec. 22, 2016

Related U.S. Application Data

(63) Continuation of application No. 14/042,015, filed on Sep. 30, 2013, now Pat. No. 9,419,892.

(51) Int. Cl.
*H04L 12/28* (2006.01)
*H04L 12/723* (2013.01)
(Continued)

(52) U.S. Cl.
CPC .......... *H04L 45/50* (2013.01); *H04L 41/0809* (2013.01); *H04L 45/02* (2013.01);
(Continued)

(58) Field of Classification Search
CPC ...................................................... H04L 45/50
(Continued)

(56) References Cited

U.S. PATENT DOCUMENTS 8,811,183 B1* 8/2014 Anand .................... H04L 49/25
370/237
2005/0286558 A1 12/2005 Ould-Brahim et al.
(Continued)

FOREIGN PATENT DOCUMENTS

CN 102546385 A 7/2012

OTHER PUBLICATIONS

First Office Action dated Apr. 1, 2017 for Chinese Application No. 201410509829.4.

*Primary Examiner* — Iqbal Zaidi
(74) *Attorney, Agent, or Firm* — Cooley LLP

(57) ABSTRACT

In some embodiments, an apparatus includes a first edge device that is operatively coupled to a second edge device via a switch fabric. The first edge device and the second edge device collectively define an edge device network operating with a network-address-based protocol. The first edge device communicates with the second edge device via a multiprotocol label switching (MPLS) tunnel through the switch fabric. Furthermore, the first edge device is operatively coupled to the switch fabric such that a node of the switch fabric can be modified without coordination of the edge device network. Additionally, the first edge device is operatively coupled to the second edge device to define the edge device network such that an edge device of the edge device network can be modified without coordination of the switch fabric.

20 Claims, 4 Drawing Sheets

(51) Int. Cl.
*H04L 12/947* (2013.01)
*H04L 12/24* (2006.01)
*H04L 12/751* (2013.01)
*H04L 29/12* (2006.01)

(52) U.S. Cl.
CPC ............ *H04L 49/25* (2013.01); *H04L 61/103* (2013.01); *H04L 61/2015* (2013.01); *Y02B 60/43* (2013.01)

(58) Field of Classification Search
USPC .................................. 370/235–255, 388–428
See application file for complete search history.

(56) References Cited

U.S. PATENT DOCUMENTS

| | | |
|---|---|---|
| 2006/0221813 A1 | 10/2006 | Scudder et al. |
| 2007/0140235 A1 | 6/2007 | Aysan et al. |
| 2011/0238816 A1 | 9/2011 | Vohra et al. |
| 2013/0223221 A1 | 8/2013 | Xu et al. |

* cited by examiner

METHODS AND APPARATUS FOR IMPLEMENTING CONNECTIVITY BETWEEN EDGE DEVICES VIA A SWITCH FABRIC

PRIORITY TO RELATED APPLICATION

This application claims priority to and is a continuation of U.S. application Ser. No. 14/042,015, (now U.S. Pat. No. 9,419,892), entitled "METHODS AND APPARATUS FOR IMPLEMENTING CONNECTIVITY BETWEEN EDGE DEVICES VIA A SWITCH FABRIC" and filed Sep. 30, 2013, the content of which is incorporated herein by reference in its entirety.

BACKGROUND

Some embodiments described herein relate generally to methods and apparatus for implementing connectivity between edge devices in an edge device network via a switch fabric. In particular, but not by way of limitation, some embodiments described herein relate to methods and apparatus for implementing connectivity between edge devices in an edge device network operating with a network-address-based protocol via the switch fabric that maintains administrative, control plane, data plane and/or addressing separation between the edge devices and the switch fabric devices.

Some known switch fabrics include edge devices that offer services and switch fabric devices that offer connectivity among the edge nodes and to other networks. Such known switch fabrics typically do not separate between the edge devices and the switch fabric devices for administration and/or operation. For example, the edge devices can be subject to administrative coordination with adjacent switch fabric devices. Such an approach of administrating and operating the edge devices and switch fabric devices, however, can produce a risk of adversely affecting the switch fabric and cause security vulnerability for the switch fabric. Furthermore, the edge devices and switch fabric devices are often managed by different groups.

Accordingly, a need exists for methods and apparatus for implementing connectivity between edge devices in an edge device network operating with a network-address-based protocol via the switch fabric that maintains administrative, control plane, data plane and/or addressing separation between the edge devices and the switch fabric devices.

SUMMARY

In some embodiments, an apparatus includes a first edge device that is operatively coupled to a second edge device via a switch fabric. The first edge device and the second edge device collectively define an edge device network operating with a network-address-based protocol. The first edge device communicates with the second edge device via a multiprotocol label switching (MPLS) tunnel through the switch fabric. Furthermore, the first edge device is operatively coupled to the switch fabric such that a node of the switch fabric can be modified without coordination of the edge device network. Additionally, the first edge device is operatively coupled to the second edge device to define the edge device network such that an edge device of the edge device network can be modified without coordination of the switch fabric.

DETAILED DESCRIPTION

Figure 1:
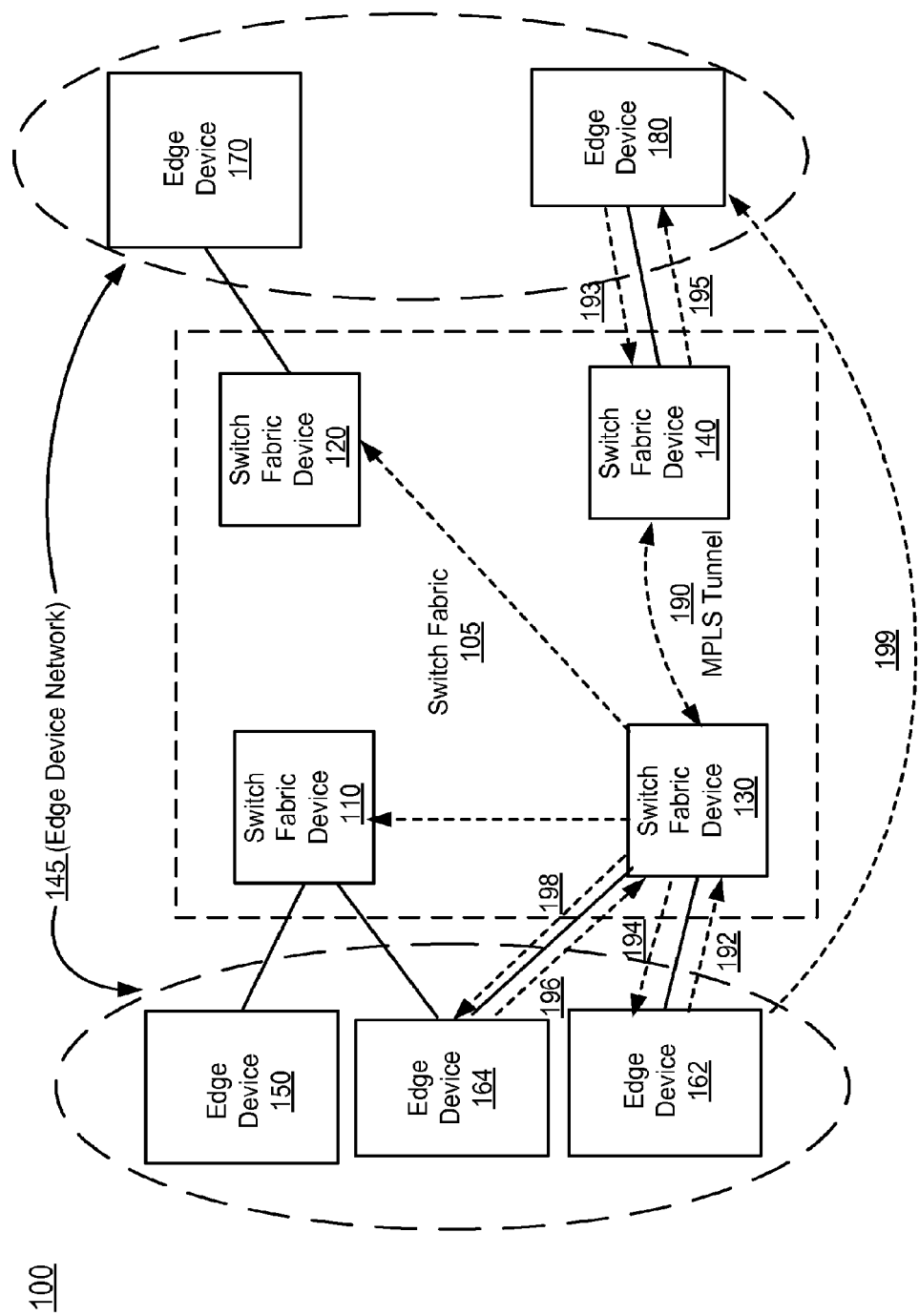
FIG. 1 is a schematic illustration of a switch fabric system that connects edge devices via a switch fabric, according to an embodiment.

In some embodiments, an apparatus includes a first edge device that is operatively coupled to a second edge device via a switch fabric. The first edge device and the second edge device collectively define an edge device network that operates with a network-address-based protocol. Such a network-address-based protocol can be, for example, an interior routing protocol (IGP), label distribution protocol (LDP), border gateway protocol (BGP), resource reservation protocol-traffic engineering (RSVP-TE) protocol, and/or the like. In such embodiments, the first edge device communicates with the second edge device via a multiprotocol label switching (MPLS) tunnel through the switch fabric.

Furthermore, the first edge device is operatively coupled to the switch fabric such that a node of the switch fabric can be modified without coordination of the edge device network. Similarly, the first edge device is operatively coupled to the second edge device to define the edge device network such that an edge device of the edge device network can be modified without coordination of the switch fabric.

In some instances, the first edge device can be configured to send a request according to an auto-discovery protocol to a first switch fabric device of the switch fabric. Such an auto-discovery protocol can be, for example, dynamic host configuration protocol (DHCP), address resolution protocol (ARP), Radius (remote authentication dial-in user service) protocol, Diameter protocol, trivial file transfer protocol (TFTP), link layer discovery protocol (LLDP), and/or the like. The first edge device can be configured to receive a response according to the auto-discovery protocol and in response to the request. The response can include a label associated with the first edge device. Furthermore, the first switch fabric device can send to a second switch fabric device of the switch fabric, according to at least one MPLS protocol, an advertisement indicating the label. The MPLS protocol can be, for example, LDP, RSVP-TE, BGP, and/or the like.

After receiving the response, the first edge device can be configured to send to the second edge device the label such that the MPLS tunnel is established between the first edge device and the second edge device based on the label. In some instances, the first edge device can be configured to send the label to the second edge device according to BGP. In some instances, the first edge device and the second edge device can communicate with the switch fabric via auto-discovery messages without any other protocol message (e.g., any network-address-based protocol message).

In some embodiments, an apparatus includes a switch fabric device that is included within a switch fabric operatively coupled to an edge device network. The edge device network operates with a network-address-based protocol such that edge devices of the edge device network can communicate via, for example, a set of MPLS tunnels through the switch fabric. In such embodiments, the switch fabric device can be modified without coordination of the edge device network. Similarly, edge devices of the edge device network can be modified without coordination of the switch fabric.

In some embodiments, an apparatus includes a first edge device operatively coupled to a switch fabric that is coupled to a second edge device. The first edge device communicates with the second edge device via an MPLS tunnel through the switch fabric. In such embodiments, the first edge device is also operatively coupled to the second edge device to define an edge device network such that an edge device of the edge device network can be modified independent of the switch fabric and a node(s) of the switch fabric can be modified independent of the edge device network.

As used in this specification, the term "physical hop" can include a physical link between two nodes and/or devices. For example, a data path operatively coupling a first node with a second node can be said to be a physical hop. Similarly stated, a physical hop can physically link the first node with the second node.

As used in this specification, the term "single physical hop" can include a direct physical connection between two nodes and/or devices in a system. Similarly stated, a single physical hop can include a link via which two nodes are coupled without intermediate nodes. Accordingly, for example, if a first node is coupled to a second node via a single physical hop, the first node can send data units (e.g., data packets, data cells, etc.) directly to the second node without sending the data units through intervening nodes.

As used in this specification, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "a tunnel module" is intended to mean a single module or a combination of multiple modules collectively configured to perform a function of tunneling data.

FIG. 1 is a schematic illustration of a switch fabric system 100 that connects edge devices (e.g., edge devices 150, 162, 164, 170, 180) via a switch fabric 105, according to an embodiment. The switch fabric system 100 includes the switch fabric 105 and an edge device network 145. The switch fabric 105 includes one or more switch fabric devices such as the switch fabric devices 110, 120, 130 and 140. The edge device network 145 includes one or more edge devices such as the edge devices 150, 162, 164, 170 and 180. In some embodiments, although not shown in FIG. 1, the switch fabric 105 can include more or less switch fabric devices than those shown in FIG. 1; the edge device network 145 can include more or less edge devices than those shown in FIG. 1.

In some embodiments, the switch fabric system 100 can be implemented in various locations and environments, and/or for different functions. For example, the switch fabric system 100 can be implemented at a data center, where the switch fabric 105 functions as the data center network and the edge device network 145 includes servers of the data center. For another example, the switch fabric system 100 can be implemented as an access network, where the switch fabric 105 is a metropolitan area network (MAN) and the edge device network 145 includes MPLS-enabled DSLAMs (digital subscriber line access multiplexers), eNodeBs (e-utran node B, or evolved node B), OLTs (optical line terminations), and/or the like. For yet another example, the switch fabric system 100 can be implemented as a service network, where the switch fabric 105 is a wide area network (WAN) and the edge device network 145 includes provider edge (PE) nodes.

Each edge device from the edge device network 145 is coupled to at least one switch fabric device from the switch fabric 105. For example, as shown in FIG. 1, the switch fabric device 110 is coupled to the edge devices 150 and 164; the switch fabric device 120 is coupled to the edge device 170; the switch fabric device 130 is coupled to the edge devices 162 and 164; and the switch fabric device 140 is coupled to the edge device 180. In some embodiments, although not shown in FIG. 1, each switch fabric device from the switch fabric 105 can be operatively coupled (e.g., via MPLS tunnels) to each remaining switch fabric device from the switch fabric 105. Thus, each edge device from the edge device network 145 can be operatively coupled to each remaining edge device from the edge device network 145 via the switch fabric 105.

Each edge device of the edge device network 145 can be any device configured to be operatively coupled to the switch fabric 105. Such an edge device can be, for example, a compute node, server, router, access switch, gateway, and/or the like. In some embodiments, an edge device can be an input node, an output node, a top-of-rack (TOR) device, and/or the like. In some embodiments, an edge device can function as both a source edge device and a destination edge device for data transmission. In some embodiments, although not shown in FIG. 1, an edge device of the edge device network 145 can be coupled to one or more peripheral processing devices or customer nodes. In such embodiments, the edge device can operatively couple the peripheral processing device(s) to the switch fabric 105. The edge device can send data units (e.g., a stream of data packets and/or data cells) to and receive data units from the switch fabric 105, and to and from the coupled peripheral processing device(s).

The peripheral processing devices (not shown in FIG. 1) that can be connected to the edge devices of the edge device network 145 can include, for example, servers, storage devices, gateways, workstations, and/or the like. The peripheral processing devices can be operatively coupled to one or more ports of the edge devices using any suitable connection such as, for example, an optical connection (e.g., an optical cable and optical connectors), an electrical connection (e.g., an electrical cable and electrical connectors) and/or the like. Similarly stated, each port of the edge device can provide a communication interface through which a peripheral processing device can be operatively coupled to that edge device. As such, the peripheral processing devices can send data units to and receive data units from the edge devices. In some instances, the connection between the peripheral processing devices and the edge devices can be a direct link. Such a link can be said to be a single physical hop link. In other instances, the peripheral processing devices can be operatively coupled to the edge devices via intermediate nodes. Such a connection can be said to be a multiple physical hop link.

In some embodiments, the edge devices of the edge device network 145 can be configured to provide services (e.g., to customers) such as, for example, VPN (virtual private network), pseudowire, Internet access, and/or the like. The edge devices can be upgraded, configured, rebooted or shut down for maintenance when, for example, new customers join the switch fabric system 100, new services are initiated, new edge devices are introduced to accommodate new customers, and/or the like. Additionally, in some embodiments, an edge device can be referred to as, for example, a label edge, PE router, provider edge node, etc.

Figure 2:
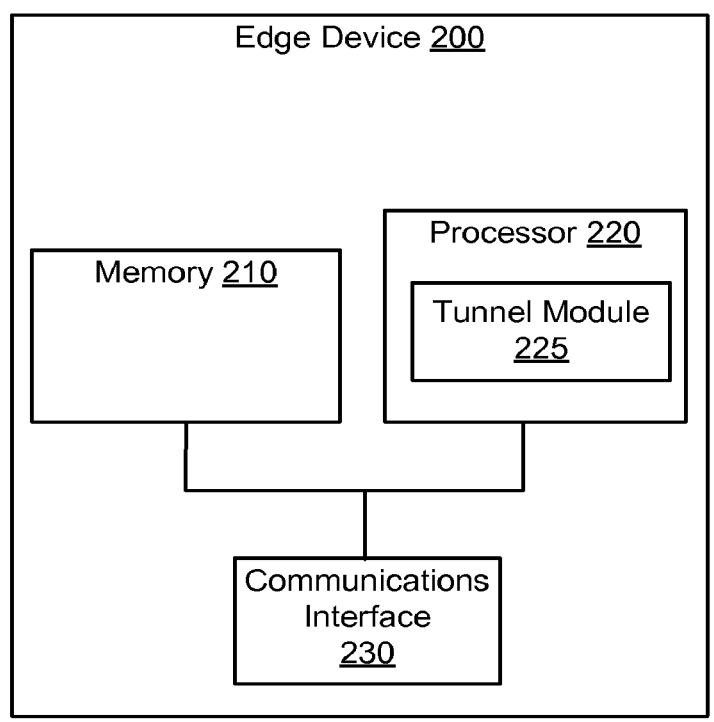
FIG. 2 is a system block diagram of an edge device, according to an embodiment.

FIG. 2 is a block diagram of an edge device 200, according to an embodiment. The edge device 200 can be structurally and functionally similar to the edge devices 150, 162, 164, 170, 180 shown and described with respect to FIG. 1. Particularly, similar to the edge devices of the edge device network 145 in FIG. 1, the edge device 200 can be any device configured to be coupled to one or more switch fabric devices of a switch fabric (e.g., the switch fabric devices 110, 120, 130, 140 of the switch fabric 105 in FIG. 1). Thus, the edge device 200 can be operatively coupled to one or more other edge devices via the switch fabric.

As shown in FIG. 2, the edge device 200 includes a communications interface 230, a memory 210, and a processor 220 that includes a tunnel module 225. Although not shown in FIG. 2, the edge device 200 can include other modules with various functions. For example, the edge device 200 can include a DHCP module configured to obtain an address (according to DHCP) from the switch fabric device that operatively couples the edge device 200 to the switch fabric. For another example, the edge device 200 can include an ARP module configured to communicate with the switch fabric device that operatively couples the edge device 200 to the switch fabric according to ARP.

Each operation(s) of the communications interface 230 (e.g., transmit/receive data), the tunnel module 225 (e.g., encapsulate/decapsulate data units), other modules (not shown in FIG. 2) of the edge device 200, as well as operation(s) on the memory 210, can be controlled by the processor 220. The processor 220 can be any suitable processor configured to run and/or execute the module(s) included in the processor 220. Each module in the processor 220 can be any combination of hardware-based module (e.g., a field-programmable gate array (FPGA), an application specific integrated circuit (ASIC), a digital signal processor (DSP), etc.) and/or software-based module (e.g., a module of computer code stored in the memory 210 and/or executed at the processor 220) capable of performing one or more specific functions associated with that module.

The tunnel module 225 can be configured to enable the edge device 200 to transmit data to and receive data from other edge devices coupled to the switch fabric using a tunnel though the switch fabric. In some embodiments, as described in detail below, the tunnel module 225 can be configured to enable the edge device 200 to communicate with other edge devices using a MPLS tunnel through the switch fabric. Specifically, the tunnel module 225 can be configured to encapsulate data with a label stack associated with the MPLS tunnel. As described in detail below, such a label stack can include one or more labels such as a label identifying a MPLS tunnel connecting two switch fabric devices in the switch fabric, a label identifying a route from a switch fabric device to an edge device coupled to that switch fabric device, and/or the like.

The communications interface 230 of the edge device 200 can include, for example, one or more ports (not shown in FIG. 2) that can be used to implement connection(s) (e.g., wired connection, wireless connection) between the edge device 200 and the switch fabric device(s) that operatively couple the edge device 200 to the switch fabric. The connection(s) can be, for example, twisted-pair electrical signaling via electrical cables, fiber-optic signaling via fiber-optic cables, and/or the like. As such, the edge device 200 can be configured to receive data and/or send data through the port(s) of the communications interface 230, which are connected with the communications interfaces of the switch fabric device(s). Furthermore, in some embodiments, the edge device 200 can implement one type of connection with one of the switch fabric devices (e.g., the switch fabric device 110 in FIG. 1) through one port of the communications interface 230, while implementing a different type of connection with another switch fabric device (e.g., the switch fabric device 130 in FIG. 1) through another port of the communications interface 230.

In some embodiments, the memory 210 can be, for example, a random-access memory (RAM) (e.g., a dynamic RAM, a static RAM), a flash memory, a removable memory, and/or so forth. The control information associated with interacting with the switch fabric device(s) that operatively couple the edge device 200 to the switch fabric and establishing MPLS tunnels with other edge devices through the switch fabric can be stored in the memory 210. For example, as discussed below, an address assigned to the edge device 200 and/or a label identifying a route from a switch fabric device (i.e., the switch fabric device that couples the edge device 200 to the switch fabric) to the edge device can be stored in the memory 210. For another example, labels identifying routes to other edge devices, and/or labels identifying MPLS tunnels within the switch fabric can also be stored in the memory 210.

Returning to FIG. 1, each switch fabric device (e.g., the switch fabric device 110, 120, 130, 140) of the switch fabric 105 can be any device configured to be operatively coupled to other switch fabric device(s) and/or edge device(s) (e.g., the edge devices 150, 162, 164, 170, 180) such that the switch fabric 105 can operatively couple the edge devices with each other and enable data transmission among the edge devices. Thus, the switch fabric devices of the switch fabric 105 can be configured to offer connectivity among the edge devices and to other networks (not shown in FIG. 1). Such a switch fabric device can be, for example, a routing device (e.g., a L2/L3 router), switching device (e.g., a L2/L3 switch), gateway, workstation, server, compute node, and/or the like. In some embodiments, a switch fabric device can be referred to as, for example, a core node, label switch, provider node, provider router, fabric node, etc.

In some embodiments, the switch fabric devices of the switch fabric 105 do not offer services other than providing connectivity to the edge devices. In such embodiments, maintenance of a switch fabric device is performed when a hardware or software failure occurs at the switch fabric device, a new line card is to be installed at the switch fabric device, and/or the like. As discussed in detail below, because of the separated administration and operation between the edge device network 145 and the switch fabric 105, the switch fabric devices are not disturbed when an edge device is modified.

Figure 3:
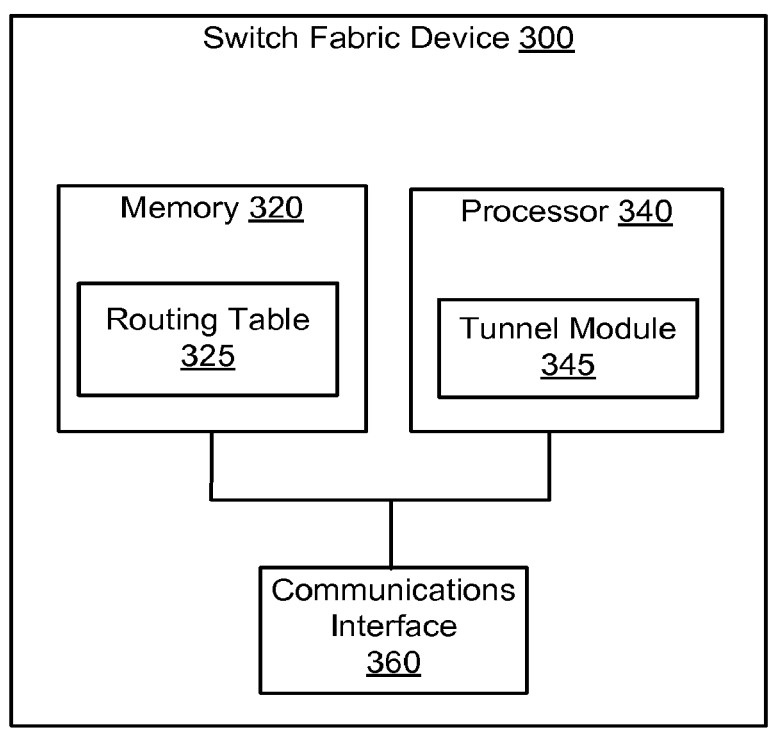
FIG. 3 is a system block diagram of a switch fabric device, according to an embodiment.

FIG. 3 is a system block diagram of a switch fabric device 300, according to an embodiment. The switch fabric device 300 can be structurally and functionally similar to the switch fabric devices 110, 120, 130, 140 shown and described with respect to FIG. 1. Particularly, similar to the switch fabric devices of the switch fabric 105 in FIG. 1, the switch fabric device 300 can be included within a switch fabric (e.g., the switch fabric 105 in FIG. 1), and configured to operatively couple one or more edge devices (e.g., the edge devices 150, 162, 164, 170, 180 in FIG. 1) to that switch fabric.

As shown in FIG. 3, the switch fabric device 200 includes a communications interface 360, a memory 320 that includes a routing table 325, and a processor 340 that includes a tunnel module 345. Although not shown in FIG.

3, the switch fabric device 300 can include other modules with various functions. For example, the switch fabric device 300 can include a DHCP module configured to handle DHCP requests received from the edge device(s) coupled to the switch fabric device 300. For another example, the switch fabric device 300 can include an ARP module configured to communicate with the edge device(s) that are coupled to the switch fabric device 300 according to ARP.

Each operation(s) of the communications interface 360 (e.g., transmit/receive data), the tunnel module 345 (e.g., transmitted tunneled data), other modules (not shown in FIG. 3) of the switch fabric device 300, as well as operation(s) on the memory 320 (e.g., manipulation on the routing table 325), can be controlled by the processor 340. The processor 340 can be any suitable processor configured to run and/or execute the module(s) included in the processor 340. Each module in the processor 340 can be a hardware-based module (e.g., a CPU, a general purpose processor, a FPGA, an ASIC, a DSP, etc.), a software-based module (e.g., a module of computer code stored in the memory 320 and/or executed at the processor 340), and/or a combination of hardware and software-based modules that is capable of performing one or more specific functions associated with that module.

The tunnel module 345 can be configured to enable the switch fabric device 300 to transmit tunneled data to and receive tunneled data from other switch fabric devices or edge device(s) coupled to the switch fabric device 300. Particularly, as described in detail below, the tunnel module 345 can be configured to enable transmission of tunneled data using MPLS tunnels that connect the switch fabric device 300 with other switch fabric devices of the switch fabric. Thus, edge device(s) coupled to the switch fabric device 300 can communicate with other edge devices coupled to the switch fabric using the MPLS tunnels through the switch fabric device 300. The tunnel module 345 can also be configured to decapsulate data to retrieve label(s) included in the data, and determine a route to transmit the decapsulate data based on the retrieved label(s). In some embodiments, the tunnel module 345 can be configured to determine a route (e.g., a MPLS tunnel) for tunneled data based on routing information stored in the routing table 325.

The communications interface 360 of the switch fabric device 300 can include, for example, at least two ports (not shown in FIG. 3) that can be used to implement connections between the switch fabric device 300 and the edge device(s), and between the switch fabric device 300 and other switch fabric device(s) of the switch fabric. The connections can be, for example, twisted-pair electrical signaling via electrical cables, fiber-optic signaling via fiber-optic cables, and/or the like. As such, the switch fabric device 300 can be configured to receive data and/or send data through the ports of the communications interface 360, which are connected with the communications interfaces of the edge device(s) and the other switch fabric device(s). Furthermore, in some embodiments, the switch fabric device 300 can implement one type of connection with one of the edge device(s) and other switch fabric device(s) through one port of the communications interface 360, while implementing a different type of connection with another edge device or switch fabric device through another port of the communications interface 360. For example, the switch fabric device 300 can implement a twisted-pair electrical signaling connection (e.g., via an electrical cable) with an edge device and implement a fiber-optic signaling connection (e.g., via a fiber-optic cable) with another switch fabric device.

In some embodiments, the memory 320 can be, for example, a RAM (e.g., a dynamic RAM, a static RAM), a flash memory, a removable memory, and/or so forth. The control information associated with interacting with the edge device(s) that are coupled to the switch fabric device 300 can be stored in the memory 320. In some embodiments, routing information associated with tunneling data with other switch fabric device(s) can be stored in the routing table 325. In some embodiments, for example, the routing table can be configured to store a label forwarding information base (LFIB) that includes routing information associated with labels for the MPLS tunnels and/or the edge devices of the edge device network.

For example, a LFIB in the routing table 325 can store an entry including a label identifying a MPLS tunnel connecting the switch fabric device 300 with another switch fabric device, and an identifier of a port of the switch fabric device 300 (included in the communications interface 360) associated with the MPLS tunnel. Thus, in response to receiving data unit(s) including the label identifying the MPLS tunnel, the tunnel module 345 can determine the port based on the label and the entry stored in the LFIB in the routing table 325. The tunnel module 345 can then send the data unit(s) via the port, such that the data unit(s) is sent to the other switch fabric device through the MPLS tunnel.

For another example, a LFIB in the routing table 325 can store an entry including a label identifying an edge device coupled to the switch fabric device 300, and an identifier of a port of the switch fabric device 300 (included in the communications interface 360) associated with the edge device. Thus, in response to receiving data unit(s) including the label identifying the edge device, the tunnel module 345 can determine the port based on the label and the entry stored in the LFIB in the routing table 325. The tunnel module 345 can then send the data unit(s) via the port, such that the data unit(s) is sent to the edge device.

Returning to FIG. 1, in some embodiments, the edge device network 145 and the switch fabric 105 can be separately administrated, controlled and/or operated. That is, the switch fabric system 100 can implement separated administration, control and/or operation for the edge devices (e.g., the edge devices 150, 162, 164, 170, 180) of the edge device network 145 and for the switch fabric devices (e.g., the switch fabric devices, 110, 120, 130, 140) of the switch fabric. In such embodiments, the separation between the edge devices and the switch fabric devices can be implemented in one or more aspects including, for example, administrative separation, control plane separation, data plane separation, address separation, and/or the like.

In some embodiments, administrative separation can be implemented between the edge devices of the edge device network 145 and the switch fabric devices of the switch fabric 105. Specifically, the edge devices and the switch fabric devices can be administrated by two (independent) groups of administrators separately. For example, the edge device network 145 can be administrated by a group of one or more edge administrators, and the switch fabric 105 can be administrated by another group of one or more fabric administrators. Each edge administrator or fabric administrator can be, for example, a person, a machine (automatically executed or manually operated by a person), or a combination of person(s) and machine(s) that performs the administrating function for the edge device(s) or the switch fabric device(s).

As a result of the administrative separation, no coordination is required from one side of the edge device network 145 or the switch fabric 105 when the other side of the edge device network 145 or the switch fabric 105 is being administrated (e.g., modified, configured). For example, the fabric administrator(s) can administrate (e.g., reboot, upgrade, modify configuration, change MPLS protocol setting, etc.) a switch fabric device (e.g., the switch fabric device 110, 120, 130 or 140) of the switch fabric 105 without coordination from the edge administrator(s) and without disruption, modification or reconfiguration to any edge device of the edge device network 145. For another example, similarly, the edge administrator(s) can administrate (e.g., reboot, upgrade, modify configuration, etc.) an edge device (e.g., the edge device 150, 162, 164, 170 or 180) of the edge device network 145 without coordination from the fabric administrator(s) and without disruption, modification or reconfiguration to any switch fabric device of the switch fabric 105.

Furthermore, as a result of administrative separation and/or other separation mechanisms, plug-and-play connectivity can be implemented for the edge device network 145 and the switch fabric 105. That is, the edge administrator(s) can add, remove or move edge devices without coordination with the fabric administrator(s) and without disruption, modification or reconfiguration to the edge devices. Similarly, the fabric administrator(s) can add, remove or move edge devices without coordination with the fabric administrator(s) and without disruption, modification or reconfiguration to the switch fabric devices.

In some embodiments, routing protocol separation can be implemented between the edge devices of the edge device network 145 and the switch fabric devices of the switch fabric 105. Specifically, the routing protocol implemented within the switch fabric 105 can be performed (e.g., exchange of signals, messages, etc.) without coordination of the edge device network. Furthermore, the protocol (e.g., DHCP, ARP) implemented between the edge devices and the switch fabric devices can be performed (e.g., exchange of signals, messages, etc.) without coordination between the edge administrator(s) and the fabric administrator(s). As a result, the protocols implemented in the switch fabric system 100 can be performed and managed without administrative coordination between the fabric administrator(s) and the edge administrator(s).

In some embodiments, as shown in FIG. 1, multiple edge devices (e.g., the edge devices 162, 164) can be coupled to one switch fabric device (e.g., the switch fabric device 130). In some embodiments, as shown in FIG. 1, an effective multi-homing mechanism can be implemented for the edge devices of the edge device network 145. Specifically, an edge device can be coupled and multi-homed to more than one switch fabric device. In such embodiments, the multiple links between the edge device and the associated switch fabric devices can be used for load balancing traffic transmitted between the edge device and the switch fabric 105. As a result, the traffic within the switch fabric 105 can be load balanced as well. Furthermore, the multiple links between the edge device and the associated switch fabric devices can be used to improve resilience for the connection between the edge device and the switch fabric 105. As a result, fast restoration can be achieved for data transmission between the edge device and the switch fabric 105. Specifically, the failover time upon detection of a failure (e.g., a failure at a link connecting the edge device and an associated switch fabric device, a failure at an associated switch fabric device coupled to the edge device) can be reduced by directing data traffic to the remaining link(s) that connect the edge device and the switch fabric 105.

For example, as shown in FIG. 1, the edge device 164 can be coupled, via two separate links respectively, to the switch fabric devices 110 and 130. As a result, data traffic transmitted between the edge device 164 and the switch fabric devices 110, 130 can be load balanced between the two links. Furthermore, data traffic within the switch fabric 105 that is transmitted to or from the switch fabric devices 110, 130 can be load balanced based on the load on the two links. Additionally, the two links can be used to improve resilience and provide fast restoration for the edge device 164.

In some embodiments, connectivity isolation can be implemented between the edge devices of the edge device network 145 and the switch fabric devices of the switch fabric 105. Specifically, each edge device from the edge device network 145 does not communicate directly with each remaining edge device from the edge device network 145. Instead, the edge devices of the edge device network 145 communicate with each other through the switch fabric 105. That is, each edge device from the edge device network 145 can send data unit(s) (e.g., data-plane data unit(s), control-plane data unit(s)) to each remaining edge device from the edge device network 145 via one or more switch fabric devices of the switch fabric 105, but not directly from one edge device to another edge device. Furthermore, the data unit(s) (e.g., data-plane data unit(s), control-plane data unit(s)) that can be transmitted between the edge devices and the switch fabric devices is restricted. For example, data unit(s) can be transmitted between the edge devices and the switch fabric devices according to a set of given protocols. In other words, data unit(s) is not transmitted between the edge devices and the switch fabric devices according to any protocol not included in the set of given protocols. In some instances, for example, the switch fabric 105 can provide MPLS connectivity (e.g., via MPLS tunnels) to the edge devices of the edge device network 145 without providing Internet protocol (IP) connectivity to those edge devices. Thus, data unit(s) can be transmitted between the edge devices and the switch fabric devices according to an MPLS protocol, but not according to an IP routing protocol. As a result of connectivity isolation, a compromised edge device is not enabled to attack the switch fabric 105. Similarly, a compromised switch fabric device is not enabled to attack the edge device network 145.

In some embodiments, address separation (or address independence) can be implemented between the edge devices of the edge device network 145 and the switch fabric devices of the switch fabric 105. Specifically, the edge device network 145 and the switch fabric 105 can use two independent address domains, respectively. In some instances, the two address domains can have overlapping address(es) but without conflict of the overlapping address (es). In some instances, the two address domains can be completely different (i.e., sharing no overlapping address).

In some embodiments, an edge device of the edge device network 145 can be configured to obtain an address, according to an auto-discovery protocol (e.g., DHCP, ARP), from a switch fabric device coupled to that edge device. In such embodiments, for example, an edge administrator responsible for administrating the edge device network 145 can select an address space (e.g., an address domain) for the edge device network 145 and then notify a fabric administrator responsible for administrating the switch fabric 105 of the selected address space. Furthermore, the edge administrator can also update any change on the address space for the edge device network 145 to the fabric administrator. As a result, the fabric administrator can assign an address space, which is not overlapping with the address space for the edge device network 145, to the switch fabric devices of the switch fabric 105. Thus, the addresses assigned to the edge devices can be different from the addresses assigned to the switch fabric devices.

For example, the edge device 162 can send a request for address (e.g., a DHCP request, an ARP request) to the switch fabric device 130. In response to the request, an address is selected from an address space for the edge device network 145 at the switch fabric device 130 and then sent from the switch fabric device 130 to the edge device 162. In some instances, the address assigned to the edge device 162 can be also included in an address space for the switch fabric 105. Thus, that address will not be assigned to any switch fabric device of the switch fabric 105; as a result no switch fabric device shares the identical address with the edge device 162.

In some embodiments, the switch fabric devices (e.g., the switch fabric devices 110, 120, 130, 140) of the switch fabric 105 can be collectively configured to enable data transmission between the edge devices (e.g., the edge devices 150, 162, 164, 170, 180) of the edge device network 145. The switch fabric 105 can be configured to implement a mesh of label-switched paths (LSPs) such that the switch fabric devices of the switch fabric 105 can transmit data with each other using the mesh of LSPs. The mesh of LSPs can be implemented using MPLS tunnels that connect the switch fabric devices, thus to form a mesh of MPLS tunnels. In some embodiments, routing protocols such as, for example, IGP, LDP, RSVP-TE, etc., can be used to generate the mesh of MPLS tunnels. Specifically, the mesh of MPLS tunnels can be established by executing, for example, LGP with LDP, RSVP-TE, and/or other routing protocol within the switch fabric 105.

In some embodiments, the mesh of MPLS tunnels is implemented within the switch fabric 105 and not extended to the edge devices of the edge device network 145. That is, the routing protocol(s) implemented within the switch fabric 105 are not implemented at the connections between the switch fabric devices and the edge devices. Instead, an auto-discovery protocol (e.g., DHCP, ARP, LLDP) can be used to enable communication between the switch fabric devices and the edge devices. Details of enabling data transmission between edge devices using MPLS tunnels are further described below.

As discussed above, the switch fabric 105 and the edge device network 145 each can have an independent address space. In such instances, each switch fabric device of the switch fabric 105 can be allocated a block of addresses (e.g., IP addresses) from the address space for the edge device network 145. Thus, a switch fabric device can assign an address from the block of addresses allocated to that switch fabric device to an edge device in response to receiving a request (e.g., a DHCP request, an ARP request) from that edge device. Furthermore, in some embodiments, the switch fabric devices of the switch fabric 105 can maintain IP connectivity among themselves without offering IP connectivity to the edge devices of the edge device network 145.

A method of initializing data transmission between an edge device (e.g., the edge device 162) and other edge devices (e.g., the edge devices 164, 170, 180) using MPLS tunnels through the switch fabric 105 can be considered in reference to FIG. 1. Initially, the edge device 162 can send a request (shown as signal 192 in FIG. 1) to the switch fabric device 130 according to an auto-discovery protocol (e.g., DHCP, ARP, LLDP). In some embodiments, the edge device 162 can be configured to send such a request in response to, for example, the edge device 162 being booted up, turned on, coupled to the switch fabric device 130, and/or the like.

In some embodiments, the request can be a request for an address and/or a label assigned to the edge device 162. For example, the request can be a DHCP request for an IP address assigned to the edge device 162 and/or a label for other edge devices to send data to the edge device 162. In response to the request, the switch fabric device 130 can send a response (shown as signal 194 in FIG. 1) to the edge device 162. The response can include an address (e.g., IP address) assigned to the edge device 162. For example, the switch fabric device 130 can assign an IP address 10.1.3.1 to the edge device 162. As discussed above, the address assigned to the edge device 162 can be selected from an address space for the edge device network 145 that is independent of an address space for the switch fabric 105. In some embodiments, the address space for the edge device 145 can overlap with the address space for the switch fabric 105. As a result, the address assigned to the edge device 162 can correspond to an address included in (but not yet assigned from) the address space for the switch fabric 105. In such embodiments, the address assigned to the edge device 162 can be selected such that that address is not assigned to any switch fabric device of the switch fabric 105.

In some embodiments, in response to the request, the switch fabric device 130 can define a label for the edge device 162 such that the label can be used to route data to the edge device 162. For example, the switch fabric device 130 can define a label [EL162→162 via 130], which indicates that the edge device 162 can be reached via the switch fabric device 130. In some embodiments, the address assigned to the edge device 162 can be included in the label defined for the edge device 162. In such embodiments, the label can be, for example, [EL162→10.1.3.1 via 130]. The switch fabric device 130 can then be configured to store the label for the edge device 162 in, for example, a routing table in the switch fabric device 130 (e.g., the routing table 325 in the switch fabric device 300 in FIG. 3). In some embodiments, the label for the edge device 162 can be added to, for example, a LFIB in the routing table. The label in the LFIB can be associated with and used to identify a port of the switch fabric device 130 that connects the switch fabric device 130 to the edge device 162.

In some embodiments, the switch fabric device 130 can be configured to send the label (together with the assigned address) to the edge device 162 (e.g., via the signal 194). In some embodiments, upon assigning the address and defining the label for the edge device 162, the switch fabric device 130 can be configured to announce the address and the label to other edge devices (e.g., the edge devices 150, 164, 170, 180) of the edge device network 145 that are coupled to the switch fabric 105, and/or to other switch fabric devices of the switch fabric 105. Specifically, the switch fabric device 130 can be configured to send an advertisement (e.g., message) including routing information for the edge device 162 (e.g., the address of the edge device 162, the label of the edge device 162, and an identifier of the switch fabric device 130 as the "next-hop" to reach the edge device 162) to the other edge devices via the switch fabric devices of the switch fabric 105. For example, the advertisement can include routing information such as 10.1.3.1, EL162, next-hop: 130. As a result, information associated with routing to the edge device 162 (including the address, label, and next-hop of the edge device 162) is made available at the other switch fabric devices of the switch fabric 105 and/or the other edge devices of the edge device network 145.

In some embodiments, as an alternative to the switch fabric device 130 sending the routing information of the edge device 162 to other edge devices, the edge device 162 can be configured to send its routing information to other edge devices of the edge device network 145. In such embodiments, the edge device 162 can send the routing information (e.g., including the address of the edge device 162, the label of the edge device 162, and an identifier of the switch fabric device 130 as the "next-hop" to reach the edge device 162) to the other edge devices according to a network-address-based protocol such as, for example, BGP. In some embodiments, the BGP messages can be sent within a control plane (not shown) of the edge device network 145 that is separate from the control plane of the switch fabric 105 (i.e., not via the switch fabric 105). In such embodiments, for example, the edge device 162 can send a BGP message including the routing information to the edge device 180 without going through the switch fabric 105 (shown as signal 199 in FIG. 1). In other embodiments, the BGP messages can be sent through the control plane of the switch fabric 105 (i.e., via the switch fabric 105). In such embodiments, for example, the edge device 162 can send a BGP message including the routing information to the edge device 180 via the switch fabric devices 130, 140 (not shown in FIG. 1).

As an example illustrated in FIG. 1, when the edge device 180 attempts to communicate with the edge device 162, the edge device 180 can first determine the switch fabric device 130 as the next-hop to reach the edge device 162 based on received routing information of the edge device 162. The edge device 180 can then send a request (shown as signal 193 in FIG. 1) to the switch fabric device 140. The request can be, for example, an ARP request to resolve a route to the switch fabric device 130. In response to the ARP request, the switch fabric device 140 can check to determine if MPLS connectivity (e.g., a MPLS tunnel) exists between the switch fabric device 140 and the switch fabric device 130. After determining that a MPLS tunnel (e.g., MPLS tunnel 190 in FIG. 1) exists between the switch fabric device 140 and the switch fabric device 130, the switch fabric device 140 can define a label for that MPLS tunnel. For example, the switch fabric device 140 can define a label [FL140-130: 140 to 130] for the MPLS tunnel 190. The switch fabric device 140 can then add the label to, for example, a LFIB in a routing table of the switch fabric device 140. The label in the LFIB can be associated with and used to identify a port of the switch fabric device 140 that connects the switch fabric device 140 to the switch fabric device 130 via the MPLS tunnel 190.

After defining the label for the MPLS tunnel 190, the switch fabric device 140 can send the label to the edge device 180 (shown as signal 195 in FIG. 1). In some embodiments, the switch fabric device 140 can send to the edge device 180, for example, an entropy label of the switch fabric device 130 and/or entropy label(s) of other switch fabric device(s). Such an entropy label can include, for example, load balancing information associated with the MPLS tunnel 190 (e.g., with respect to load balancing information of other MPLS tunnel(s) within the switch fabric 105). In some embodiments, the switch fabric device 140 can send to the edge device 180 other metric value(s) associated with the switch fabric device 130, the switch fabric device 140, and/or other switch fabric device(s). Thus, the edge device 180 can decide whether to communicate with the edge device 162 via the switch fabric devices 140 and 130 or any other alternative route (not shown in FIG. 1) through the switch fabric 105 based on the entropy label(s) and/or other metric value(s) associated with the switch fabric device 130, the switch fabric device 140, and/or other switch fabric device(s).

After receiving the label for the MPLS tunnel 190 and/or additional information, the edge device 180 can use a label stack <FL140-130, EL162> to establish a MPLS connection with the edge device 162. For example, the edge device 180 can send a data unit (e.g., a data packet, a data cell, a data frame) to the edge device 162 through the switch fabric device 140, the MPLS tunnel 190, and the switch fabric device 130. Specifically, a tunnel module of the edge device 180 (e.g., the tunnel module 225 of the edge device 200 in FIG. 2) can encapsulate the data unit with the label stack <FL140-130, EL162>. First, the label EL162 can be used at the tunnel module of the edge device 180 to encapsulate the data unit to define a first encapsulation of the data unit. Next, the label FL140-130 can be used at the tunnel module of the edge device 180 to encapsulate the first encapsulation of the data unit to define a second encapsulation of the data unit. The edge device 180 can then send the second encapsulation of the data unit, as the encapsulated data, to the switch fabric device 140.

Upon receiving the data unit encapsulated with the label stack <FL140-130> (i.e., the second encapsulation of the data unit), a tunnel module of the switch fabric device 140 (e.g., the tunnel module 345 of the switch fabric device 300 in FIG. 3) can decapsulate the label FL140-130 from the second encapsulation of the data unit to retrieve the first encapsulation of the data unit. Based on the label FL140-130, the switch fabric device 140 can determine to send the decapsulated data (i.e., the first encapsulation of the data unit) to the switch fabric device 130 via the MPLS tunnel 190. For example, the switch fabric device 140 can determine a port to send the first encapsulation of the data unit based on that an identifier of the port is associated with the label FL140-130 in the routing table of the switch fabric device 140.

Upon receiving the data unit encapsulated with the label EL162 (i.e., the first encapsulation of the data unit), a tunnel module of the switch fabric device 130 (e.g., the tunnel module 345 of the switch fabric device 300 in FIG. 3) can decapsulate the label EL162 from the first encapsulation of the data unit to retrieve the original data unit. Based on the label EL162, the switch fabric device 130 can determine to send the data unit to the edge device 162. For example, the switch fabric device 130 can determine a port to send the data unit based on that an identifier of the port is associated with the label EL162 in the routing table of the switch fabric device 130. Thus, the edge device 180 can send the data unit to the edge device 162 via an MPLS tunnel through the switch fabric 105.

As another example illustrated in FIG. 1, when the edge device 164 attempts to communicate with the edge device 162, the edge device 164 can first determine the switch fabric device 130 as the next-hop to reach the edge device 162 based on received routing information of the edge device 162. In some embodiments, similar to the edge device 180 described above, the edge device 164 can send an ARP request (shown as signal 196 in FIG. 1) to the switch fabric device 130, to resolve a route to the switch fabric device 130. In response to the ARP request, the switch fabric device 130 can return a response (shown as signal 198 in FIG. 1) including, for example, a null label to the edge device 164. Such a null label indicates that an MPLS tunnel between switch fabric devices is not used to reach the switch fabric device 130 from the switch fabric device 130. The edge device 164 can then encapsulate a data unit (e.g., a data packet, a data cell, a data frame) intended for the edge device 162 using a label stack <null label, EL162> in a method similar to that of the edge device 180 described above. The edge device 164 can then send the encapsulated data unit to the edge device 162 via the switch fabric device 130 in a method similar to that of the edge device 180 described above. In some other embodiments, the step of sending an ARP request to resolve a route to the switch fabric device 130 can be avoided or skipped if the edge device 164 determines that it is directly coupled to the switch fabric device 130 (as the next-hop to reach the edge device 162). In such embodiments, the edge device 164 can encapsulate data intended for the edge device 162 using the label EL162, and then send the encapsulated data to the switch fabric device 130. Upon receiving the encapsulated data (e.g., encapsulated using the label stack <null label, EL162> or the label EL162) from the edge device 164, the tunnel module of the switch fabric device 130 can decapsulate the encapsulated data to retrieve the original data intended for the edge device 162, and then send the data to the edge device 162.

Figure 4:
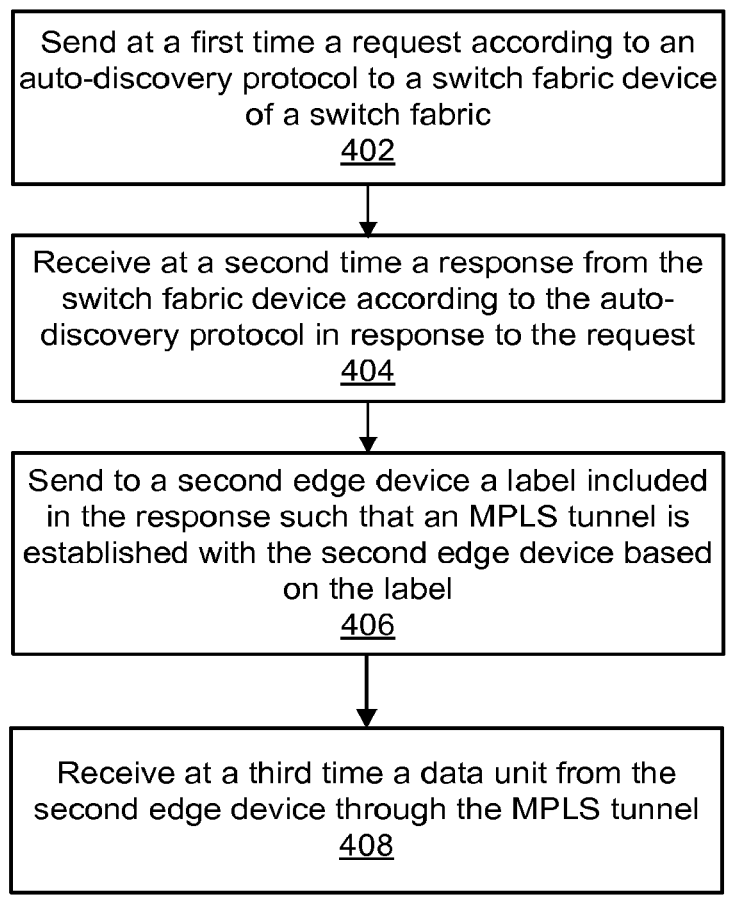
FIG. 4 is a flow chart illustrating a method for communication between edge devices via a switch fabric, according to an embodiment.

FIG. 4 is a flow chart illustrating a method 400 for communication between edge devices via a switch fabric, according to an embodiment. The method 400 can be executed at a first edge device that is structurally and functionally similar to the edge devices (e.g., the edge devices 150, 162, 164, 170, 180, 200) shown and described with respect to FIGS. 1 and 2. Particularly, the first edge device can be coupled to a switch fabric device of a switch fabric (e.g., the switch fabric device 110, 120, 130 or 140 of the switch fabric 105 in FIG. 1, the switch fabric 300 in FIG. 3). The switch fabric device is operatively coupled to a second edge device (e.g., via other switch fabric device(s) of the switch fabric).

In some embodiments, similar to the edge device 200 shown and described with respect to FIG. 2, the first edge device can include a processor (e.g., the processor 220) and a memory (e.g., the memory 210). The memory can be, for example, a non-transitory processor-readable medium. The code representing instructions to perform the method 400 can be stored in the non-transitory processor-readable medium included in the first edge device, and executed by the processor of the first edge device. The code includes code to be executed by the processor to cause the first edge device to operate the functions illustrated in FIG. 4 and described as follows.

At 402, the first edge device can send, at a first time, a request according to an auto-discovery protocol to the switch fabric device of the switch fabric. As discussed above, the auto-discovery protocol can be, for example, DHCP. The request (e.g., DHCP request) can be a request for an address to be assigned to the first edge device, and/or a label to be defined for the first edge device (e.g., the label EL162 in the example described above with respect to FIG. 1). The label can be used by other edge devices and/or switch fabric devices to route data to the first edge device.

At 404, the first edge device can receive, at a second time after the first time and in response to the request, a response from the switch fabric device according to the auto-discovery protocol. For example, the first edge device can receive a DHCP response from the switch fabric device, which includes an IP address assigned to the first edge device. In some embodiments, the response can include the label defined for the first edge device. In some embodiments, the response can include other routing information associated with routing data to the first edge device.

At 406, the first edge device can send to the second edge device a message or signal including the label, which is included in the response, such that an MPLS tunnel is established with the second edge device based on the label.

As discussed above, the first edge device can send the label to the second edge device using, for example, a BGP message. Alternatively, the switch fabric device can send advertisements (e.g., in message(s) or signal(s)) including the label to other switch fabric devices of the switch fabric, which can then in turn send the label to the other edge devices including the second edge device.

After receiving the label, the second edge device can initiate establishing an MPLS tunnel to reach the first edge device, as described in detail above. Specifically, the second edge device can determine the next-hop switch fabric device (the switch fabric device in this example) for the first edge device based on the label. The second edge device can then send an ARP request to an associated switch fabric device (i.e., the switch fabric device that operatively couples the second edge device to the switch fabric), to resolve a route to the next-hop switch fabric device. In response to the ARP request, the second edge device can receive a label identifying a MPLS tunnel (e.g., the label FL140-130 in the example described above with respect to FIG. 1) connecting the switch fabric device associated with the second edge device and the switch fabric device associated with the first edge device (e.g., the MPLS tunnel 190 connecting the switch fabric device 140 and the switch fabric device 130 in FIG. 1).

At 408, the second edge device can send a data unit using the label stack that includes the label for the first edge device and the label for the MPLS tunnel. Based on the label stack, the data can unit be transmitted to the first edge device through the switch fabric device associated with the second edge device, the MPLS tunnel, and the switch fabric device associated with the first edge device, in that order. Specifically, the label for the MPLS tunnel (e.g., FL140-130) can be used, at the switch fabric device associated with the second edge device, to route the data unit from the switch fabric device associated with the second edge device to the switch fabric device associated with the first edge device. The label for the first edge device (e.g., EL162) can be used, at the switch fabric device associated with the first edge device, to route the data unit from the switch fabric device associated with the first edge device to the first edge. As a result of the second edge device sending the data unit to the first edge device using the MPLS tunnel, the first edge device can receive the data unit from the second edge device through the MPLS tunnel at a third time after the second time.

While shown and described herein with respect to FIG. 1 that the edge devices of an edge device network interact with switch fabric devices of a switch fabric to obtain routing information (e.g., labels identifying MPLS tunnels and other edge devices) associated with communicating with other edge devices, in other embodiments, one or more route reflectors can provide routing information to the edge devices of the edge device network. Such a route reflector can be implemented at an edge device, a switch fabric device, or a device separate from the edge device network and the switch fabric. For example, a route reflector can be configured to receive, from an edge device, BGP messages including updated routing information of that edge device. The route reflector can be configured to forward the BGP messages to other edge devices. Thus, each edge device of the edge device network maintains a BGP connection with the route reflector, and does not maintain any connection with other edge devices. For another example, a route reflector can function as a DHCP server and/or an ARP server for the edge device network. Thus, each switch fabric device can forward the DHCP requests and/or ARP requests received from their associated edge devices to the route reflector (e.g., via other switch fabric devices of the switch fabric), and receive DHCP responses and/or ARP responses from the route reflector. For yet another example, a route reflector can function as a centralized controller that stores routing information associated with the switch fabric and provides the routing information to the switch fabric devices of the switch fabric. Thus, each switch fabric device communicates with the route reflector to obtain labels for the MPLS tunnels and/or the edge devices. The switch fabric devices can then use the labels received from the route reflector to route data through the switch fabric.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
   operatively coupling a node within a switch fabric separate from an edge device network such that the node of the switch fabric can be administrated without disruption, modification, or reconfiguration of edge devices of the edge device network;
   operatively coupling to an edge device via the switch fabric so as to form the edge device network to facilitate communication with the edge device via a multiprotocol label switching (MPLS) tunnel through the switch fabric, the edge device network being formed such that the edge device of the edge device network can be administrated without disruption, modification, or reconfiguration of the node operatively coupled to the switch fabric;
   receiving a signal according to an auto-discovery protocol from a switch fabric device of the switch fabric; and
   sending, to the edge device, a label included in the signal such that the edge device sends a data unit via a MPLS tunnel associated with the label.

2. The method of claim 1, wherein the method further comprises modifying the edge device without disruption or modification of the node of the switch fabric.

3. The method of claim 1, wherein the method further comprises sending an announcement signal having the label to other edge devices in the edge device network.

4. The method of claim 1, wherein the signal according to the auto-discovery protocol is received after a request, according to the auto-discovery protocol, is sent to the switch fabric device of the switch fabric.

5. The method of claim 1, wherein the auto-discovery protocol is at least one of dynamic host configuration protocol (DHCP), link layer discovery protocol (LLDP) or address resolution protocol (ARP).

6. The method of claim 1, wherein the label identifies a route from the switch fabric device to the edge device.

7. A non-transitory processor-readable medium storing code representing instructions to be executed by a processor, the code comprising code to cause the processor to:
   operatively couple a node within a switch fabric that is coupled to an edge device;
   operatively couple to the edge device to define an edge device network separate from the switch fabric, such that the edge device of the edge device network can be administrated without disruption, modification, or reconfiguration of the node operatively coupled to the switch fabric and such that the node of the switch fabric can be administrated without disruption, modification, or reconfiguration of edge devices of the edge device network;
   communicate with the edge device via a multiprotocol label switching (MPLS) tunnel through the switch fabric;
   receive a signal, according to an auto-discovery protocol, from a switch fabric device of the switch fabric; and
   send, to the edge device, a label included in the signal and including load balancing information, such that the edge device sends a data unit via a MPLS tunnel associated with the load balancing information.

8. The non-transitory processor-readable medium of claim 7, wherein the code further comprises code to cause the processor to modify the edge device without disruption or modification of the node of the switch fabric.

9. The non-transitory processor-readable medium of claim 7, wherein the code further comprises code to cause the processor to announce the label to other edge devices in the edge device network.

10. The non-transitory processor-readable medium of claim 7, wherein the signal according to the auto-discovery protocol is received after a request, according to the auto-discovery protocol, to the switch fabric device of the switch fabric.

11. The non-transitory processor-readable medium of claim 7, wherein the auto-discovery protocol is at least one of dynamic host configuration protocol (DHCP), link layer discovery protocol (LLDP) or address resolution protocol (ARP).

12. The non-transitory processor-readable medium of claim 7, wherein the label identifies a route from the switch fabric device to the edge device.

13. The non-transitory processor-readable medium of claim 7, wherein:
the switch fabric device is configured to be coupled to the edge device network such that the edge device network has a first address domain and the switch fabric has a second address domain different from the first address domain,
at least one address from the first address domain being dependent on at least one of a dynamic host configuration protocol (DHCP) request or an address resolution protocol (ARP) request.

14. The non-transitory processor-readable medium of claim 7, wherein:
the edge device is a first edge device, and
the switch fabric device is configured to be coupled to the first edge device such that the first edge device communicates with a second edge device via auto-discovery messages, without any other protocol message.

15. A method, comprising:
sending a request according to an auto-discovery protocol to a first switch fabric device of a switch fabric,
receiving a response from the first switch fabric device according to the auto-discovery protocol in response to the request, the response including an indication of an entropy label and a metric value associated with a second switch fabric device of the switch fabric or a node operatively coupled within the switch fabric;
operatively coupling an edge device to the node so as to define an edge device network separate from the switch fabric, such that the edge device of the edge device network can be administrated without disruption, modification, or reconfiguration of the node operatively coupled to the switch fabric and the node of the switch fabric can be administrated without disruption, modification, or reconfiguration of edge devices of the edge device network;
sending, to the edge device, the entropy label included in the response such that the edge device sends a data unit via a multiprotocol label switching (MPLS) tunnel associated with the entropy label; and
communicating with the edge device via the MPLS tunnel.

16. The method of claim 15, wherein the entropy label includes load balancing information associated with the MPLS tunnel.

17. The method of claim 15, wherein the auto-discovery protocol is at least one of dynamic host configuration protocol (DHCP), link layer discovery protocol (LLDP) or address resolution protocol (ARP).

18. The method of claim 15, further comprising:
encapsulating the data unit with a label stack to produce an encapsulated data unit; and
sending the encapsulated data unit to the second switch fabric device such that the second switch fabric device uses the label stack to determine a port of the edge device to which to send the encapsulated data unit.

19. The method of claim 15, further comprises announcing the label to other edge devices in the edge device network.

20. The method of claim 15, wherein the label identifies a route to the edge device.

* * * * *